US010417231B2

(12) United States Patent
Collier et al.

(10) Patent No.: US 10,417,231 B2
(45) Date of Patent: Sep. 17, 2019

(54) SYSTEM, METHOD, AND NON-TRANSITORY COMPUTER-READABLE STORAGE MEDIA FOR LOCATING A RECEIPT FOR A PRODUCT

(71) Applicant: Wal-Mart Stores, Inc., Bentonville, AR (US)

(72) Inventors: Holly Tegeler Collier, Chicago, IL (US); David Martin Nelms, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 295 days.

(21) Appl. No.: 15/195,743

(22) Filed: Jun. 28, 2016

(65) Prior Publication Data

US 2017/0371929 A1   Dec. 28, 2017

(51) Int. Cl.
*G06F 16/2455* (2019.01)
*G06Q 10/10* (2012.01)
*G06F 16/248* (2019.01)

(52) U.S. Cl.
CPC ........ *G06F 16/2455* (2019.01); *G06F 16/248* (2019.01); *G06Q 10/10* (2013.01)

(58) Field of Classification Search
CPC .............................. G06F 16/2455; G06Q 10/10
See application file for complete search history.

(56) References Cited

U.S. PATENT DOCUMENTS 5,739,512 A * 4/1998 Tognazzini ........ G06Q 20/0453
235/380
5,878,139 A   3/1999 Rosen
6,341,353 B1  1/2002 Herman et al.
6,898,598 B2  5/2005 Himmel et al.
7,487,912 B2  2/2009 Seifert et al.
(Continued)

FOREIGN PATENT DOCUMENTS

WO   1999022327        5/1999
WO   2000075834 A2    12/2000
(Continued)

OTHER PUBLICATIONS

See Definition of Point of Sale at investopedia.com (archived to Aug. 8, 2011) Aug. 8, 2011.

*Primary Examiner* — William Spieler (74) *Attorney, Agent, or Firm* — Bryan Cave Leighton Paisner LLP (57) ABSTRACT

A system for locating a receipt for a product includes a server computer of a business, a database coupled to the server computer for storing customer purchase history including electronic receipts, and a mobile computing device coupled to the server computer. The mobile computing device includes a memory for storing an application and a processor coupled to the memory for executing the application. The executing of the application causes the processor to receive an input of product identification information from the product, transmit the product identification information to the server computer, and obtain an electronic receipt selected from the electronic receipts stored in the database with the selected electronic receipt including a listing of the product. Also disclosed herein are a method and non-transitory computer-readable storage media for locating a receipt for a product.

20 Claims, 5 Drawing Sheets (56) References Cited

U.S. PATENT DOCUMENTS

| | | |
|---|---|---|
| 7,552,087 B2 | 6/2009 | Schultz |
| 7,742,989 B2 | 6/2010 | Schultz |
| 7,992,781 B2 | 8/2011 | Hammad |
| 8,346,634 B2 | 1/2013 | Shiftan |
| 8,355,946 B2 | 1/2013 | Hammond et al. |
| 2002/0120539 A1* | 8/2002 | Price .................... G06Q 30/02 705/35 |
| 2003/0055733 A1 | 3/2003 | Marshall et al. |
| 2004/0064373 A1 | 4/2004 | Shannon |
| 2004/0243489 A1 | 12/2004 | Mitchell et al. |
| 2005/0240482 A1 | 10/2005 | Ohkawa et al. |
| 2006/0047762 A1 | 3/2006 | Su |
| 2007/0235525 A1* | 10/2007 | Murch ............... H04N 1/00127 235/382 |
| 2007/0236606 A1 | 10/2007 | Reerslev et al. |
| 2008/0208742 A1 | 8/2008 | Arthur et al. |
| 2008/0246613 A1 | 10/2008 | Linstrom et al. |
| 2009/0006151 A1 | 1/2009 | Zarghami et al. |
| 2009/0271265 A1 | 10/2009 | Lay et al. |
| 2009/0271322 A1 | 10/2009 | Lay et al. |
| 2009/0276481 A1 | 11/2009 | Anna et al. |
| 2010/0100434 A1 | 4/2010 | Sock |
| 2010/0280896 A1 | 11/2010 | Postrel |
| 2010/0306080 A1* | 12/2010 | Trandal .................. G06Q 10/10 705/26.8 |
| 2011/0125598 A1 | 5/2011 | Shin et al. |
| 2011/0258065 A1* | 10/2011 | Fordyce, III ........... G06Q 10/10 705/26.1 |
| 2012/0078751 A1 | 3/2012 | MacPhail et al. |
| 2012/0084391 A1 | 4/2012 | Patel et al. |
| 2012/0118976 A1 | 5/2012 | Debski |
| 2012/0166298 A1 | 6/2012 | Smith et al. |
| 2012/0280040 A1 | 11/2012 | Carney et al. |
| 2012/0284101 A1 | 11/2012 | Schiller et al. |
| 2012/0290422 A1* | 11/2012 | Bhinder ............. G06Q 20/0453 705/21 |
| 2012/0290609 A1 | 11/2012 | Britt |
| 2013/0110659 A1 | 5/2013 | Phillips et al. |
| 2013/0173403 A1 | 7/2013 | Grigg et al. |
| 2013/0222435 A1 | 8/2013 | Choi et al. |
| 2013/0262281 A1 | 10/2013 | Purchek et al. |
| 2014/0006224 A1 | 1/2014 | Grigg et al. |
| 2014/0122270 A1 | 5/2014 | Argue et al. |
| 2014/0143104 A1* | 5/2014 | Boncimino ........ G06Q 20/3224 705/30 |
| 2014/0249997 A1* | 9/2014 | Susaki ................... G06Q 10/10 705/39 |
| 2014/0279668 A1* | 9/2014 | Lievens ................. G06Q 10/02 705/340 |
| 2014/0319206 A1* | 10/2014 | Chakra .................. G06O 30/00 235/375 |

FOREIGN PATENT DOCUMENTS

| | | |
|---|---|---|
| WO | 2007134378 A1 | 11/2007 |
| WO | 2013130031 | 9/2013 |

\* cited by examiner

SYSTEM, METHOD, AND NON-TRANSITORY COMPUTER-READABLE STORAGE MEDIA FOR LOCATING A RECEIPT FOR A PRODUCT

FIELD OF THE DISCLOSURE

The present disclosure relates generally to systems, methods, and non-transitory computer-readable storage media for locating a receipt for a product.

BACKGROUND

Sales receipts are often generated by a business or store when a customer purchases one or more products. The receipt is typically a written acknowledgement that payment for the product(s) has been received by the business or store.

Many businesses or stores allow the customer to return one or more products for a refund, exchange, and/or store credit. Typically, the customer is required to present a copy of the receipt to the business or store to initiate a return of a product. In some instances, however, the customer may have lost, misplaced, or otherwise cannot find the receipt. In other instances, the customer may have a plurality of receipts, but he/she cannot determine which one of the receipts covers the product that the customer wants to return. Accordingly, without a proper receipt, the customer may not be able to return the product to the business or store.

The present disclosure is aimed at solving the problems identified above.

SUMMARY

In different embodiments of the present disclosure, systems, methods, and non-transitory computer-readable storage media for locating a receipt for a product are provided.

In one embodiment of the present disclosure, a system for locating a receipt for a product is provided. The system comprises a server computer of a business, a database coupled to the server computer for storing a customer purchase history including a plurality of electronic receipts, and a mobile computing device coupled to the server computer. The mobile computing device coupled to the server computer includes a memory for storing an application containing computer-executable instructions and a processor coupled to the memory for executing the computer-executable instructions of the application. The executing of the computer-executable instructions causes the processor to receive an input of product identification information from the product, transmit the product identification information to the server computer, and obtain an electronic receipt selected from the plurality of electronic receipts stored in the database with the selected electronic receipt including a listing of the product.

In another embodiment of the present disclosure, a method for locating a receipt for a product is provided. The method utilizes a mobile computing device coupled to a server computer of a business. The mobile computing device includes a memory for storing an application and a processor for executing the application. The server computer is coupled to a database for storing customer purchase history including a plurality of electronic receipts. While executing the application by the processor of the mobile computing device, the method comprises the steps of: receiving an input of product identification information from the product; transmitting the product identification information to the server computer; and obtaining an electronic receipt selected from the plurality of electronic receipts stored in the database with the selected electronic receipt including a listing of the product.

In another embodiment of the present disclosure, one or more non-transitory computer-readable storage media for locating a receipt for a product is provided. The one or more non-transitory computer-readable storage media has computer-executable instructions embodied thereon and, when executed by a processor, causes the processor to: receive an input of product identification information from the product; transmit the product identification information to a server computer; and obtain an electronic receipt selected from a plurality of electronic receipts stored in a database coupled to the server computer with the selected electronic receipt including a listing of the product.

BRIEF DESCRIPTION OF THE DRAWINGS

Advantages of the present disclosure will be readily appreciated, as the same becomes better understood by reference to the following detailed description, when considered in connection with the accompanying drawings. Non-limiting and non-exhaustive embodiments and examples of the present disclosure are described with reference to the following figures, wherein like numerals refer to like parts throughout the various views unless otherwise specified.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "in one example," or "in an example" in various places throughout this specification are not necessarily all referring to the same embodiment or example. Furthermore, the particular features, structures, or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments and/or examples in accordance with the present disclosure may be embodied as an apparatus, a method, or a computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system". Furthermore, the present disclosure may take the form of a computer program product embodied in any tangible media or expression having computer-usable program code embodied in the media.

Any combination of one or more computer-usable or computer-readable media (or medium) may be utilized. For example, computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM) device, an optical storage device, and a magnetic storage device. Computer program code (e.g., computer-executable instructions) for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisional via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams(s) in the flow diagram(s) illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagram(s) and/or flowchart illustration(s), and combinations of blocks in the block diagram(s) and/or flowchart illustration(s), may be implemented by special purpose hardware-based systems that perform the specified functions or acts, or combinations of special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media product an article of manufacture including instruction means which implement the function/act specified in the flowchart and/or block diagram block or blocks.

Several (or different) elements discussed below, and/or claimed, are described as being "coupled," "in communication with," or "configured to be in communication with." This terminology is intended to be non-limiting, and where appropriate, be interpreted to include without limitation, wired and wireless communication using any one or a plurality of suitable protocols, as well as communication methods that are constantly maintained, are made on a periodic basis, and/or made or initiated on an as needed basis.

In addition, and for clarity in discussing the various functions of the system of the present disclosure, multiple server computers (or just computers or servers) are discussed as performing different functions. These different server computers may, however, be implemented in different ways such as modules within a single computer, as nodes of a computer system, etc. The functions performed by the system (or nodes or modules) may be centralized or distributed in any suitable manner across the system and its components, regardless of the location of specific hardware. Furthermore, specific components of the system may be referenced using functional terminology in their names. The functional terminology is used solely for the purposes of naming convention and to distinguish one element from another in the following discussion. Unless otherwise specified, the name of an element conveys no specific functionality to the element or component.

With reference to the figures, and in operation, the present disclosure provides a system 10, method, and one or more non-transitory computer-readable storage media for locating a receipt for a product. In various embodiments, the present disclosure describes how a customer can utilize an application resident on his/her mobile computing device to locate an electronic receipt for a product that the customer would like to return to a business or store for a refund, exchange, store credit, and/or the like. Upon locating the electronic receipt, the mobile computing device utilizes the application to display a copy of the electronic receipt on the display screen of the mobile computing device. The customer can thereafter present the electronic receipt displayed on the display screen of the mobile computing device when returning the product to the business or store.

The present disclosure also describes how a customer can utilize the application resident on his/her mobile computing device to locate an electronic receipt for a product utilizing product identification information taken directly from the product. The product identification information may be displayed on the product and/or on a packaging of the product. The product identification may be embedded in a barcode displayed on the product and/or on the packaging of the product and/or written, printed, or established as alpha and/or numeric characters on the product or a packaging of the product. The application resident on the mobile computing device may enable the customer to input the product identification information, such as by scanning the barcode displayed on the product or packaging, capturing an image of the barcode displayed on the product or packaging, or entering the alpha and/or numeric characters representing the product identification information utilizing a keypad or microphone of the mobile computing device.

The present disclosure also describes how a customer can utilize the application resident on his/her mobile computing device to locate a receipt for one of a plurality of products (which may or may not be identical products) in instances where the customer would like to return one of the plurality of products. In this embodiment, the application can utilize product identification information taken directly from the product to obtain a plurality of receipts, with each receipt including a listing of at least one of the plurality of products. The plurality of receipts may be presented on the display screen of mobile computing device, and the customer can select one of the receipts presented on the device that contains a listing of the particular product that the customer would like to return.

Accordingly, the system 10, method, and non-transitory computer-readable storage media provides an effective and efficient way for the customer to locate and obtain a copy of a receipt for a product so the customer can, for example, successfully return the product to a business or store.

The term "product" is used to describe any object, item, or article of manufacture that the customer has purchased from a business or store. Further, "product identification information" is or includes any information or data that identifies, or can be used to identify the product. In an example, product identification information may include an identifier of the product, such as a product name, a numeric identifier or product code, an alphanumeric identifier or product code, a universal product code (UPC), and/or the like. The product identification information can be displayed directly on the product and/or directly on a packaging of the product. The packaging of the product may include a box, bag, wrapping, carton, crate, etc. within which the product is placed/packaged. In addition, the product identification information may be embedded in a barcode displayed directly on the product and/or the packaging of the product and/or may be written, printed, or established directly on the product and/or the packaging of the product utilizing alpha, numeric, or alphanumeric characters.

Figure 1:
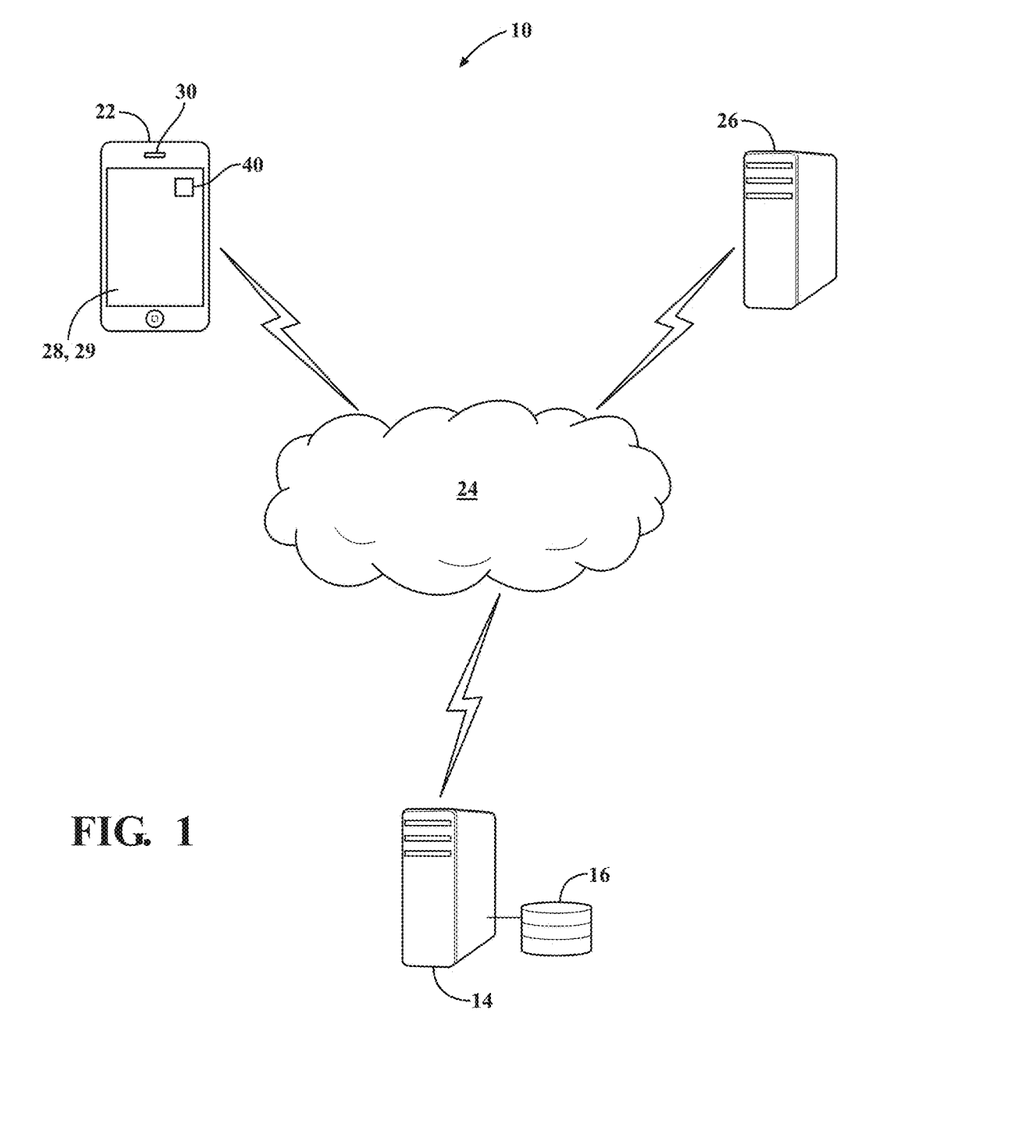
FIG. 1 is a schematic illustrating an embodiment of a system for locating a receipt for a product.

An example of the system 10 which is usable for locating a receipt for a product is shown in FIG. 1. It will be understood that the present disclosure, as generally described and illustrated in the figures, could be arranged and designed in a wide variety of different configurations. Thus, the following more detailed description of the embodiments of the present disclosure, as represented in the figures, is not intended to limit the scope of the present disclosure, as claimed, but is merely representative of certain examples of presently contemplated embodiments in accordance with the present disclosure. The presently described embodiments may be understood by reference to the figures, where like parts are designated by like numerals throughout.

Referring to the example set forth in FIG. 1, the system 10 includes a business, such as a retail business. Examples of retail businesses include a clothing business, a shoe business, a grocery business, an accessory business, an office supply business, a furniture business, a toy/hobby business, a pet supply business, a home remodeling business, and/or like. In some examples, the business is a combination of retail businesses, such as a business which sells clothing, shoes, and grocery, a business that sells office supplies and furniture, etc.

In an embodiment, the business is or includes a store, which is a physical establishment designed for the direct sale of products to a customer. In another embodiment, the business is or includes a web-based store for the sale of products to a customer through the Internet. In another embodiment, the business includes a central office (such as a headquarters) and a plurality of stores designed for the direct sale of products to a customer. In yet another embodiment, the business includes a central office and a plurality of stores for the direct sale of products to a customer, as well as a web-based store for the sale of products over the Internet. In embodiments where the business includes a plurality of stores, the business may include two, three, four . . . , hundreds, or even thousands of stores. Typically, the stores are located in various geographic locations, such as in different cities, in different towns, in different counties, on different streets or roads, on the same street but a mile or two away from one another, etc.

As shown, the system 10 further includes a server computer 14 of the business (also referred to as a business server computer) and a database 16 (also referred to as a business database) coupled the business server computer 14. The business server computer 14 includes a processor and a memory device coupled or connected to the business database 16 to retrieve and store information contained in the business database 16. Typically, the server computer 14 and the database 16 are located at the central office of the business. Alternatively, the server computer 14 and the database 16 may be located offsite (i.e., not at the central office), but are still considered to be part of the central office of the business.

The processor of the business server computer 14 executes various programs, and thereby controls components of the server computer 14. The processor may be a single processor or a plurality of processors. Further, the processor may be a controller, a microcontroller, a microprocessor, an application specific integrated circuit (ASIC), or a processor working in conjunction with a central processing unit (CPU) performing the function of a general purpose computer. The processor of the server computer 14 may be configured to execute computer programs containing computer-readable and/or executable instructions for performing a selected process. In embodiments where the server computer 14 contains a plurality of processors, the processors can operate in parallel or distributed manner. In an example, the processor of the server computer 14 may execute various modules of the system 10.

The memory coupled to the processor of the server computer 14 may include a read only memory (ROM) and random access memory (RAM) for storing the computer-readable and/or executable instructions of the computer programs. Further, the memory of the server computer 14 may be configured to store programs and information in the database 16, and to retrieve information from the database 16 that may be used by the processor of the server computer 14 and/or an application 40 resident on a mobile computing device 22 to perform various steps of the method for locating a receipt for a product described herein. The memory may also include, but is not limited to, a hard disc drive, an optical disc drive, and/or a flash memory drive.

The database 16 contains or stores, for example, a customer purchase history for each customer. The customer purchase history includes data or information for customer in-store purchase (i.e., purchases made by the customer at the business or one or more stores associated with the business) and/or customer online purchases (i.e., purchases made by the customer online or through the Internet). The customer purchase history typically includes a plurality of receipts, with each receipt including a listing of one or more products that the customer purchased during a single transaction. In an example, each receipt includes a listing of each product purchased, where the listing may include the product name and the universal product code (UPC) for the product. The receipt may also include the quantity of each product purchased, a price for each product purchased, a total transaction price and the dollar amount tendered, how the dollar amount was tendered (e.g., with cash, credit card, store credit, check or promissory note, and/or the like), where the transaction took place, the time and date that the transaction took place, etc. In an example, the customer purchase history may further include an identification of all of the products ever purchased by the customer, when each of these products was purchased, how many of each of these products were purchased, how much the customer paid for each of these products, the products returned by the customer and reasons why the products were returned, how often the customer purchases these products, etc.

In an embodiment, when a transaction is completed, the server computer 14 of the business or the server computer of the store(s) associated with the business may create an electronic version of the receipt (i.e., an electronic receipt or e-receipt) for the transaction. In instances where the electronic receipt is created by the server computer 14 of the business, the server computer 14 may automatically store the electronic receipt in the customer purchase history in the database 16. In instances where the electronic receipt is created by the server computer of a store associated with the business, the server computer of the store may automatically transmit the electronic receive to the server computer 14 of the business which stores the electronic receipt in the customer purchase history in the database 16. In some instances, the business or store associated with the business may create a paper receipt for a customer's transaction. In these instances, the customer can scan the paper receipt utilizing, e.g., a scanning feature of the mobile computing device 22. Utilizing a suitable software program or application 40 resident on the mobile computing device 22, the customer can upload and store the scanned receipt into his/her customer purchase history stored in the database 16.

In an embodiment, the database 16 may further contain or store, for example, a customer profile. The customer profile may includes identification information of a customer, such as the customer's name, residential or postal address, phone number, email address, and account information (such as credit card information, billing information, coupons, credits, etc.).

The customer purchase history and the customer profile may be stored in the same database 16. In another embodiment, the database 16 may include several sub-databases, and the customer purchase history and the customer profile may be stored in separate sub-databases. In still another embodiment, the database 16 may represent a plurality of databases with the customer purchase history stored in one of the databases and the customer profile stored in another one of the databases.

As shown in FIG. 1, the business server computer 14 is coupled in communication to the mobile computing device 22 via a communications network 24. The communications network 24 may be any suitable connection, including the Internet, file transfer protocol (FTP), an Intranet, a local area network (LAN), a virtual private network (VPN), cellular networks, etc. Further, the communications network 24 may utilize any suitable or combination of technologies including, but not limited to, wired and wireless connections, always on connections, connections made periodically, and connections made when needed.

The mobile computing device 22 may include any suitable device that enables the customer to access and communicate with the system 10 including sending and/or receiving information to and from the system 10 and displaying information retrieved from the system 10 to the customer. Examples of the mobile computing device 22 include, but are not limited to, a laptop or notebook computer, a tablet computer, a smartphone/tablet computer hybrid, a personal data assistant, a handheld mobile device including a cellular telephone, and/or the like. The mobile computing device 22, as well as any other connected computer systems and their components included in the system 10, can create message related data and exchange message related data (e.g., near field communication (NFC) payloads, Bluetooth packets, Internet Protocol (IP) datagrams, and other higher layer protocols that utilize IP diagrams, such as Transmission Control Protocol (TCP), Hypertext Transfer Protocol (HTTP), Simple Mail Transfer Protocol (SMTP), etc.) over the communications network 24.

In an embodiment, the mobile computing device 22 is or includes a smartphone or tablet computer. In another embodiment, the mobile computing device 22 includes a processor coupled to a memory, and a database for storing various programs and data for use in operating the mobile computing device 22. The mobile computing device 22 may also include a display screen 28, one or more video imaging cameras 30, one or more speakers, a microphone, at least one input button, and one or more sensors including, but not limited to, a touch ID fingerprint sensor coupled to the input button, a barometer, a three-axis gyro, an accelerometer, a proximity sensor, and an ambient light sensor. The display screen 28 includes any type of device capable of displaying information to the customer utilizing the mobile computing device 22. An example of a display screen 28 includes a touchscreen display device. In addition, the mobile computing device 22 may include a Wi-Fi antenna, a cellular network antenna, a Bluetooth communications device, assisted GPS and GLONASS, a digital compass, and an iBeacon microlocation device.

In an embodiment, the mobile computing device 22 further includes a web browser stored in the memory. The processor of the mobile computing device 22 executes the web browser program to display webpages on the display screen 28 that includes information received from the server computer 14 of the business to enable the customer to interact with and operate various functions associated with the server computer 14. In addition, the mobile computing device 22 may be programmed to store and execute a mobile program application (i.e., an application 40) that displays a user interface 29 on the display screen 28 that allows the customer to access the business server computer 14 to retrieve and store information, as well as to interact with the server computer 14 for performing one or more steps of the method for locating a receipt for a product described in detail below.

The system 10 further includes a website host server 26 configured to host a website (such as a business website) that is accessible by the customer via any computing device having access to the Internet, such as the mobile computing device 22. The website host server 26 retrieves and stores webpages associated with one or more websites in response to requests received from the customer via the mobile computing device 22. The webpage allows the customer to interact with the website and provide the customer with access to his/her customer profile and customer purchase history stored in the business database 16 by entering an appropriate login and password. In an embodiment, upon accessing the customer profile, the customer can enter, change, and/or update customer profile information such as the customer's name, address, phone number, etc.

Embodiments of a method for locating a receipt for a product are described in detail below. In each of these embodiments, the method steps may be performed utilizing an application 40 for locating a receipt for a product. The application 40 is a computer program including computer-readable or -executable instructions stored in a non-transitory computer-readable medium that can direct a computing device (e.g., the mobile computing device 22) or other programmable data processing apparatus to function in a particular manner, such that the instructions stored in the computer-readable or -executable medium produce an article of manufacture including instruction means which implement the function/act specified in the flowchart and/or block diagram block or blocks.

In an embodiment, the application 40 may be loaded onto the mobile computing device 22 to cause a series of operational steps to be performed for locating a receipt for a product. Upon entering appropriate authentication information (such as an appropriate login and password), the application 40 performs a series of operational steps for locating a receipt for a product. For instance, the application 40 can utilize product identification information obtained directly from the product, obtain an electronic receipt from the business server computer 14 that includes a listing of the product associated with or identified by the product identification information, and present the electronic receipt to the customer on the display screen 28 of the mobile computing device 22. The customer can, for example, utilize the electronic receipt to return the product for a refund, exchange, store credit, and/or the like. In certain embodiments, the application 40 can obtain a plurality of receipts from the business server computer 14 and present the plurality of receipts on the display screen 28 of the mobile computing device 22. In these embodiments, the application 40 further enables the customer to search through the receipts and select one of the receipts including a listing of the product that the customer would like to return. In addition, the application 40 may also be used, by the customer, for uploading paper receipts, view customer purchase history, and update the customer profile.

Figure 2:
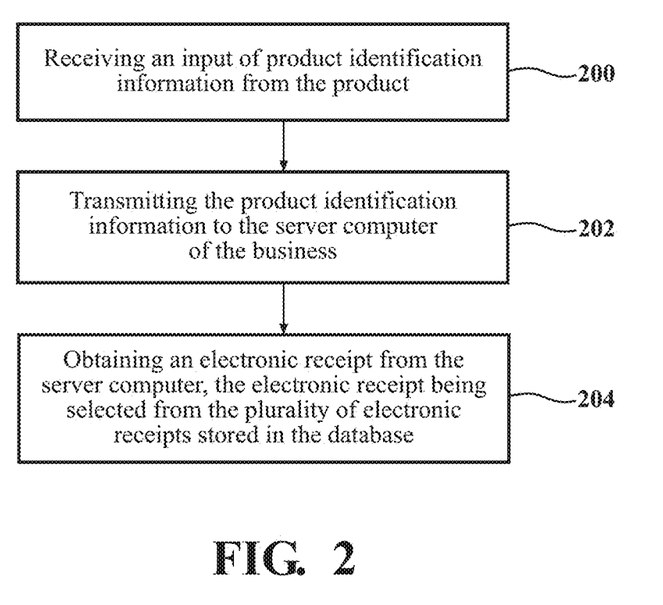
FIG. 2 is a flowchart illustrating an embodiment of a method for locating a receipt for a product.

Referring now to FIG. 2, an embodiment of the method for locating a receipt for a product is described in detail below. The method utilizes the mobile computing device 22 coupled to the business server computer 14 and includes a memory for storing the application 40 and a processor for executing the application. The server computer 14 is coupled to the database 16 containing customer purchase history including a plurality of electronic receipts. The method steps set forth in FIG. 2 are performed by executing the application 40 by the processor of the mobile computing device 22 and includes the steps of receiving an input of product identification information from the product (step 200), transmitting the product identification information to the server computer 14 of the business (step 202), and obtaining an electronic receipt from the server computer 14, the electronic receipt being selected from the plurality of electronic receipts stored in the database 16 (step 204). The selected electronic receipt includes a listing of the product.

Details of embodiments of the method are described below with reference to FIGS. 3-8. In the embodiments of the method described below, the mobile computing device 22 is a smartphone with the application 40 loaded or resident on the device 22.

Figure 3:
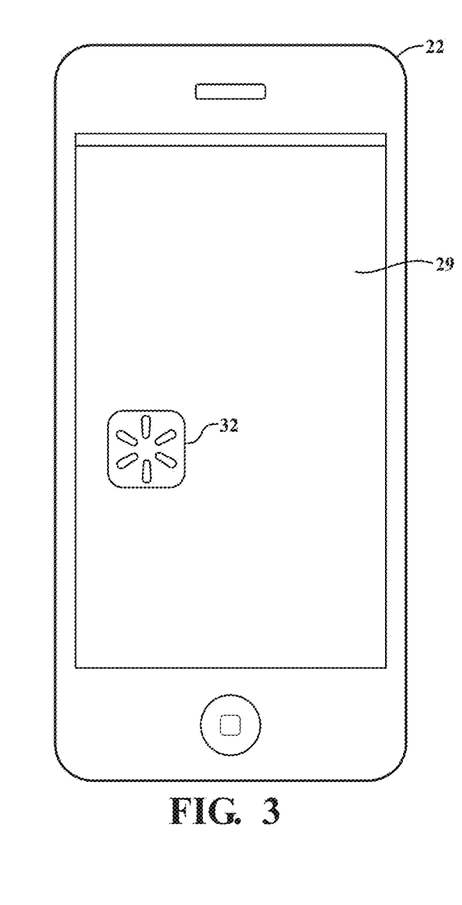
FIGS. 3-8 illustrates examples of different screens displayed on a mobile computing device that are generated by an application resident on the mobile computing device.

As shown in FIG. 3, the customer can access the application 40 on the mobile computing device 22 by locating and selecting (via, e.g., the touch of the customer's finger) an icon 32 present on the display screen 28 of the mobile computing device 22. In some instances, upon selecting the icon 32, the customer may be required to enter appropriate identification information into a login screen, such as a login name and password. Upon entering the appropriate identification information, the customer is automatically identified by the application 40. Alternatively, the customer's identification information may already be entered and stored such that when the application 40 is activated, the customer is already identified and can bypass the login screen.

Figure 4:
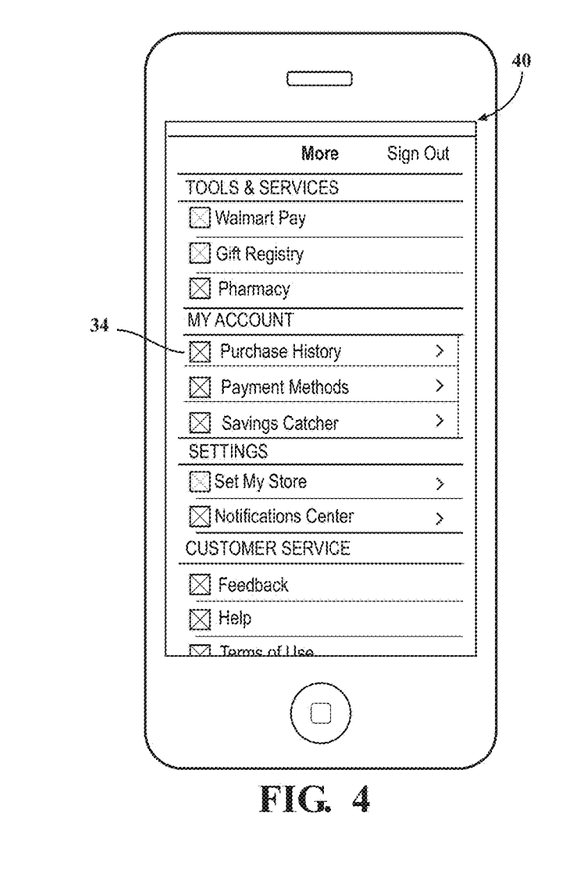
Figure 5:
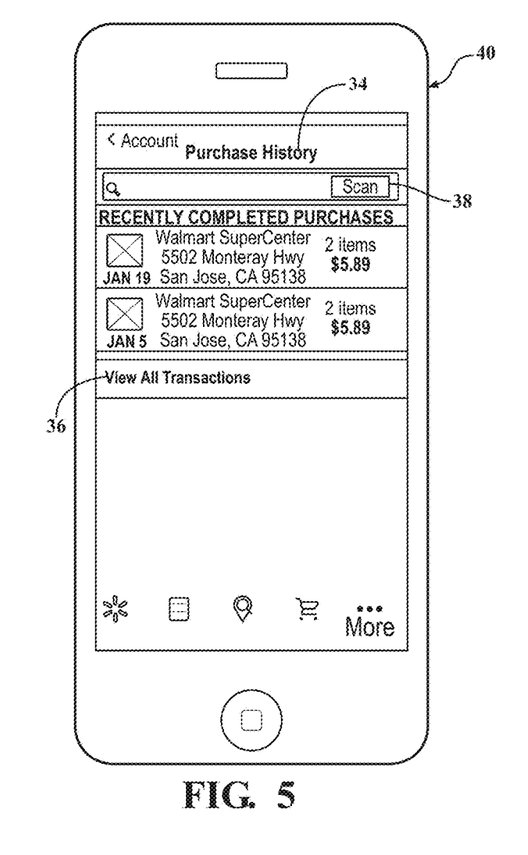

Upon identifying the customer, the mobile computing device 22 (by instructions from the application 40) displays a home screen on the display screen 28 of the mobile device 22. As shown in FIG. 4, the home screen may include a plurality of menu options with one of the menu options including Customer Purchase History 34. Upon selecting the Customer Purchase History button (such as by touching the Customer Purchase History utilizing the customer's finger), the application 40 presents a summary of the customer's purchases on the display screen 28 of the mobile computing device 22 as shown in FIG. 5. In an example, the summary may include the date of the purchase, the name and location of the store where the purchase was made, the number of products or items purchased, and the total amount (in dollars) tendered or paid for the purchase. In another example, the application 40 may present recently completed purchases on the display screen 28, while all purchases can be viewed by selecting a "View All Transactions" button 36 on the screen.

Figure 6:
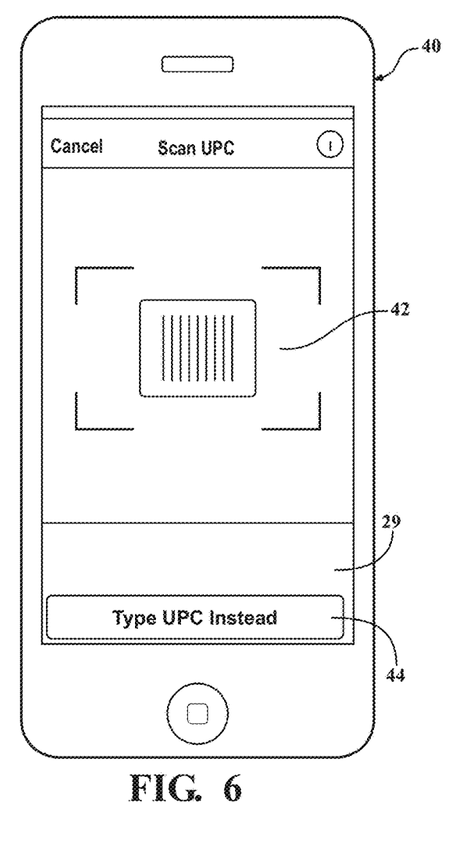

In instances where the customer cannot locate a receipt for a particular product (e.g., the customer may have forgotten where the product was purchased, the date the product was purchased, and/or the like), the customer can enter or input product identification information into the application 40 so that the application 40 can locate the receipt for the customer. Accordingly, and as previously mentioned, the method includes receiving an input of product identification information from the product. In an embodiment, the input of product identification information may be or include a universal product code of the product, and the universal product code may be embedded in a barcode displayed directly on the product or on a packaging of the product. In an example, the step of receiving the input of product identification information includes receiving the universal product code directly from the product. This may be accomplished by scanning the universal product code displayed on the product. For instance, and as shown in FIG. 5, the application 40 may include a "scan" button 38 displayed on the purchase history screen. Upon selecting the "scan" button 38, a barcode screen may be presented to the customer which includes a barcode scanner 42, as shown in FIG. 6. The customer can scan the universal product code, which may be embedded in the barcode on the product or the packaging of the product, by holding the barcode scanner 42 adjacent the barcode on the product or packaging. When aligned with the barcode, the barcode scanner 42 automatically scans the barcode on the product or packaging. The application 40 can then decode the scanned barcode and obtain the universal product code of the product directly from the scanned barcode.

In an alternative example, the step of receiving the input of product identification information may be accomplished by capturing an image of the universal product code utilizing the camera 30 of the mobile computing device 22 and receiving the universal product code from the image captured by the camera 30. In this example, the universal product code may be presented on the product or packaging by alpha and/or numeric characters or embedded in a barcode. The application 40 could include another button on the purchase history screen that the customer can select to activate the camera 30, and the customer can take the image of the universal product code utilizing the activated camera 30. Alternatively, the customer could take an image of the universal product store utilizing the camera 30, and store the image in the memory of the mobile computing device 22. In this example, the application 40 could include another button on the purchase history screen that the customer can select to upload the image stored in the memory of the mobile computing device 22. Upon obtaining the image taken by the camera 30, the application 40 can then obtain the universal product code of the product directly from the image.

In yet another example, the step of receiving the input of product identification information may be accomplished by inputting the universal product code by keyword entry utilizing the user interface 29 of the mobile computing device 22. In instances where the universal product code is presented on the product or packaging by alpha and/or numeric characters, the customer can input the universal product code into the application 40 by selecting the "Type UPC Instead" button 44 presented at the bottom of the screen shown in FIG. 6, and typing the characters utilizing a keypad of the user interface 29.

Upon receiving or obtaining the product identification information from the product or packaging, the method further includes transmitting (utilizing the communication network 24) the product identification information to the server computer 14 of the business. Upon receiving the transmission of the product identification information from the mobile computing device 22, the processor of the server computer 14 obtains at least one electronic receipt from a plurality of electronic receipts stored in the customer purchase history in the database 16. For example, upon receiving the product identification information, the processor of the server computer 14 executes computer-executable instructions causing the processor to select at least one of the plurality of electronic receipts from the customer purchase history stored in the database 16 that includes the listing of the product associated with the product identification information. This may be accomplished by the processor, for example, by comparing the universal product code or other identification information of the product obtained from the mobile device 22 (from the application 40 resident on the mobile computing device 22) with the universal product code or other identification information for each of the products listed on each of the electronic receipts stored in the customer purchase history. The processor of the server computer 14 selects each receipt stored in the customer purchase history that includes a listing for a product having the same universal product code or other identification information as the product that the customer would like to return. The server computer 14 then transmits the selected receipt(s) to the mobile computing device 22.

Upon receiving the selected receipt from the server computer 14, the method further includes displaying the selected receipt on the display screen 28 of the mobile computing device 22. The selected receipt displayed on the display screen 28 may be a copy of a receipt that was generated by the business or store when the purchase was made. The receipt displayed on the display screen 28 may also include a scannable barcode. The customer can return the product by taking the product to the business, or a store associated with the business, with the electronic receipt displayed in the mobile computing device 22. In instances where the point-of-sale terminal at the business or store includes a barcode scanner, the clerk at the business or store can scan the scannable barcode on the selected receipt to initiate a return of the product.

Figure 7:
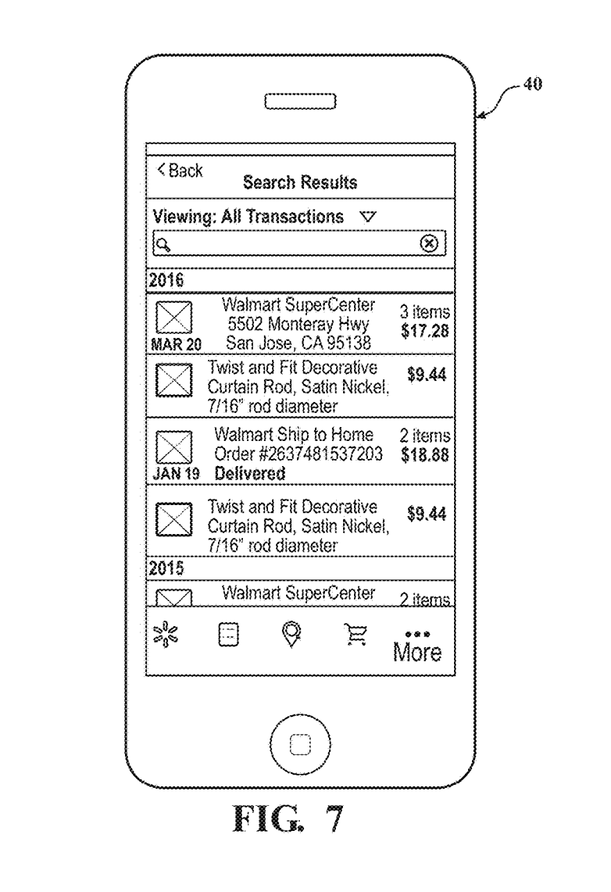
Figure 8:
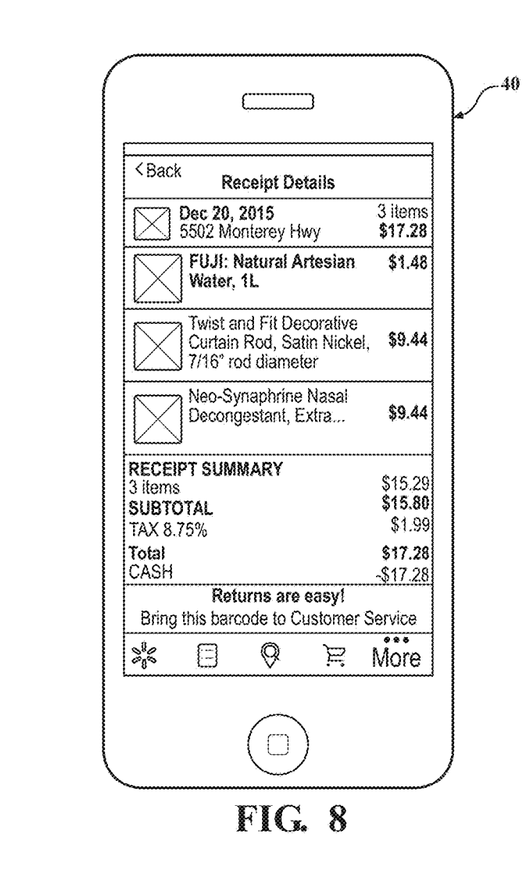

In another embodiment, after comparing the universal product code or other identification information of the product obtained from the mobile computing device 22 with that of each of the products set forth on each of the electronic receipts stored in the customer purchase history, the processor of the server computer 14 may select more than one receipt including a listing for a product having the same universal product code or other identification information as that of the product that the customer would like to return. In this embodiment, the processor of the server computer 14 transmits all of the selected receipts to the mobile computing device 22. Upon receiving the selected receipts from the server computer 14, as shown in FIG. 7 for example, the method includes displaying the selected receipts on the display screen 28 of the mobile computing device 22. The method further includes searching the selected electronic receipts to locate the listing of the product that the customer would like to return. In an example, the customer can search or scroll through the electronic receipts presented on the display screen 28 of the mobile computing device 22, identify on the receipts that includes the listing of the product, and select one of the receipts by touching or tapping the receipt presented on the screen 28. Upon selecting one of the receipts, and as shown in FIG. 8, the details of the receipt is presented on the display screen 28 including the products purchased during that transaction, the amount paid for each of the products, the number of products purchased, the location of the store that the purchase was made, and the date the purchase was made. The receipt presented on the display screen 28 also includes a scannable code that can be scanned, by a point-of-sale terminal, to initiate a return of the product.

It is to be appreciated that the several embodiments and/or examples of the system and method for locating a receipt for a product described above can be utilized for more than simply returning the product to a local store. For instance, the system and method described above may also be used to locate a receipt in order to return the product by mail, to repurchase the product, and/or to check the warranty of the product.

Furthermore, several embodiments and/or examples of a system and method for locating a receipt for a product utilizes the application 40 loaded or resident on the mobile computing device 22. It is to be understood that the embodiments and/or examples of the method may alternatively be performed utilizing any suitable computing device, which is not necessarily mobile. For example, the method may be performed utilizing a desktop computer, a laptop computer, a netbook computer, and/or the like. Other variations of the embodiments and/or examples of the method understood by those skilled in the art which are not specifically mentioned above are also contemplated herein.

The above description of illustrated embodiments and examples of the present disclosure, including what is described in the Abstract, are not intended to be exhaustive or to be a limitation to the precise forms disclosed. While specific embodiments of, and examples for, the present disclosure are described herein for illustrative purposes, various equivalent modifications are possible without departing from the broader spirit and scope of the present disclosure.

What is claimed is:

1. A system comprising:
a server computer configured to be accessed by a web browser of a mobile computing device to display web pages on a display screen of the mobile computing device to enable a user to interact with and operate multiple functions associated with the server computer;
a database coupled to the server computer for storing a customer purchase history comprising a plurality of electronic receipts; and
an application running on the mobile computing device and in data communication with the server computer, the application configured to access the server computer and display a user interface on the display screen, the application comprising computer-executable instructions being stored in a memory of the mobile computing device and configured to be executed on a processor of the mobile computing device, the computer-executable instructions of the application causing the processor to:

receive an input of product identification information from a product;

transmit the product identification information to the server computer via a computer network;

enable searching of the plurality of electronic receipts to locate a listing of the product on two or more of the plurality of electronic receipts;

obtain, from the server computer via the computer network and based on the enabled searching, the two or more of the plurality of electronic receipts stored in the database; and display, on the display screen of the mobile computing device, for each electronic receipt of the two or more of the plurality of electronic receipts, (a) an overall view of the electronic receipt comprising a quantity identifier of a number of items in the electronic receipt, an overall purchase price for the electronic receipt, and a purchase location for the electronic receipt, and (b) an individual item view for the product within the electronic receipt, the individual item view comprising the product identification information of the product and an individual price of the product in the electronic receipt.

2. The system as set forth in claim 1 wherein:
the product has a universal product code displayed on the product; and
the computer-executable instructions of the application causing the processor to receive the input of the product identification information from the product is further defined as the computer-executable instructions of the application causing the processor to receive the universal product code directly from the product.

3. The system as set forth in claim 1 wherein:
the product has a universal product code displayed on the product; and
the computer-executable instructions of the application causing the processor to receive the input of the product identification information from the product is further defined as the computer-executable instructions of the application causing the processor to scan the universal product code displayed on the product.

4. The system as set forth in claim 1 wherein:
the product has a universal product code displayed on the product;
the mobile computing device further includes a camera for capturing an image of the universal product code; and
the computer-executable instructions of the application causing the processor to receive the input of the product identification information from the product is further defined as the computer-executable instructions of the application causing the processor to receive the universal product code from the image captured by the camera.

5. The system as set forth in claim 1 wherein:
the product has a universal product code displayed on the product; and
the application running on the mobile computing device includes the user interface; and
the computer-executable instructions of the application causing the processor to receive the input of the product identification information from the product is further defined as the computer-executable instructions of the application causing the processor to receive the universal product code from a keypad entry utilizing the user interface of the mobile computing device.

6. The system as set forth in claim 1, wherein:
the computer-executable instructions of the application causes the processor to upload paper receipts to the application running on the mobile computing device.

7. The system as set forth in claim 1, wherein:
the computer-executable instructions of the application further cause the processor to:
display a homescreen comprising a plurality of menu options with one of the menu options comprising a summary of purchases on the display screen.

8. The system as set forth in claim 1, wherein:
the computer-executable instructions of the application further cause the processor to display, on the display screen of the mobile computing device, a scannable code associated with the two or more of the plurality of electronic receipts; and
said scannable code is scannable by a point-of-sale terminal to initiate returning of the product.

9. The system as set forth in claim 8, wherein the scannable code is a barcode.

10. The system as set forth in claim 1, wherein:
the plurality of electronic receipts of the customer purchase history stored in the database includes electronic receipts from customer in-store purchases and electronic receipts from customer online purchases.

11. A method comprising:
locating a receipt for a product utilizing a server computer configured to be accessed by a web browser of a mobile computing device to display web pages on a display screen of the mobile computing device to enable a user to interact with and operate multiple functions associated with the server computer;

storing with a memory a database for storing a customer purchase history comprising a plurality of electronic receipts;

running an application on the mobile computing device and in data communication with the server computer, the application configured to access the server computer and display a user interface on the display screen, the application comprising computer-executable instructions being stored in a memory of the mobile computing device and configured to be executed on a processor of the mobile computing device to perform:

receiving an input of product identification information from the product;

transmitting the product identification information to the server computer via a computer network;

enabling searching of the plurality of electronic receipts to locate a listing of the product on two or more of the plurality of electronic receipts;

obtaining, from the server computer via the computer network and based on the enabled searching, the two or more of the plurality of electronic receipts stored in the database; and displaying, on the display screen of the mobile computing device, for each electronic receipt of the two or more of the plurality of electronic receipts, (a) an overall view of the electronic receipt comprising a quantity identifier of a number of items in the electronic receipt, an overall purchase price for the electronic receipt, and a purchase location for the electronic receipt, and (b) an individual item view for the product within the electronic receipt, the individual item view comprising the product identification information of the product and an individual price of the product in the electronic receipt.

12. The method as set forth in claim 11 wherein:
the product has a universal product code displayed on the product; and
receiving the input of the product identification information from the product is further defined as receiving the universal product code directly from the product.

13. The method as set forth in claim 11 wherein:
the product has a universal product code displayed on the product; and
receiving the input of the product identification information from the product is further defined as scanning the universal product code displayed on the product.

14. The method as set forth in claim 11 wherein:
the product has a universal product code displayed on the product; and
the mobile computing device further includes a camera and further comprising capturing an image of the universal product code utilizing the camera.

15. The method as set forth in claim 14 wherein the receiving the input of the product identification information from the product is further defined as receiving the universal product code from the image captured by the camera.

16. The method as set forth in claim 11 wherein:
the product has a universal product code displayed on the product and the application running on the mobile computing device further includes the user interface, and wherein the receiving the input of the product identification information from the product is further defined as inputting the universal product code by keypad entry utilizing the user interface of the mobile computing device.

17. The method as set forth in claim 11 wherein:
the server computer includes the processor for executing the computer-executable instructions of the application and while executing the computer-executable instructions of the application by the processor of the server computer, the method further comprises:
receiving the product identification information from the application running on the mobile computing device;
selecting at least one of the plurality of electronic receipts from the customer purchase history stored in the database; and
transmitting the electronic receipt to the application running on the mobile computing device.

18. The method as set forth in claim 11 wherein:
obtaining an electronic receipt selected from the plurality of electronic receipts stored in the data base is further defined as obtaining more than one electronic receipt selected from the plurality of electronic receipts stored in the database with each of the electronic receipts, and wherein the method further comprises:
displaying a homescreen comprising a plurality of menu options with one of the menu options comprising a summary of purchases on the display screen.

19. One or more non-transitory computer-readable storage media having computer-executable instructions of an application embodied thereon and, when executed by a processor, causes the processor to:
locate a receipt fora product utilizing a server computer configured to be accessed by a web browser of a mobile computing device to display web pages on a display screen of the mobile computing device to enable a user to interact with and operate multiple functions associated with the server computer;
store with a database a customer purchase history comprising a plurality of electronic receipts;
run the application on the mobile computing device and in data communication with the server computer, the application configured to access the server computer and display a user interface on the display screen, the application comprising the computer-executable instructions being stored in a memory of the mobile computing device and configured to be executed on the processor of the mobile computing device, the computer-executable instructions of the application causing the processor to:
receive an input of product identification information from the product;
transmit the product identification information to the server computer via a computer network;
enable searching the plurality of electronic receipts to locate a listing of the product on two or more of the plurality of electronic receipts;
obtain, from the server computer via the computer network and based on the enabled searching, the two or more of the plurality of electronic receipts stored in the database; and
display, on the display screen of the mobile computing device, for each electronic receipt of the two or more of the plurality of electronic receipts, (a) an overall view of the electronic receipt comprising a quantity identifier of a number of items in the electronic receipt, an overall purchase price for the electronic receipt, and a purchase location for the electronic receipt, and (b) an individual item view for the product within the electronic receipt, the individual item view comprising the product identification information of the product and an individual price of the product in the electronic receipt.

20. The one or more non-transitory computer-readable storage media of claim 19, wherein the computer-executable instructions of the application further causes the processor to receive the input of the product identification information from the product is further defined as the computer-executable instructions of the application causing the processor to receive a universal product code directly from the product.

* * * * *